Patented Sept. 18, 1945

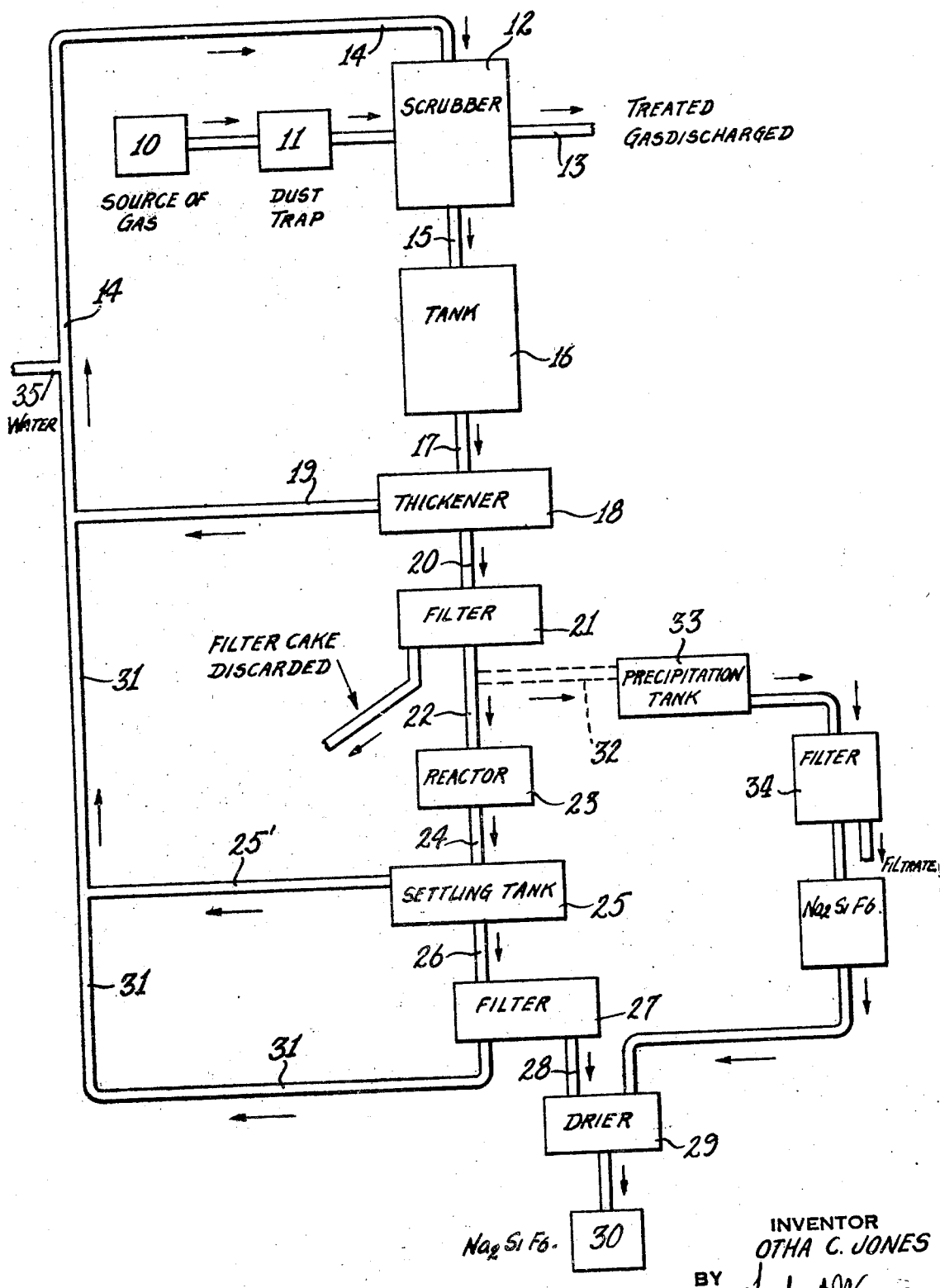

2,385,208

UNITED STATES PATENT OFFICE 2,385,208

PROCESS FOR RECOVERING FLUORINE COMPOUNDS

Otha C. Jones, Anniston, Ala., assignor to Monsanto Chemical Company, a corporation of Delaware Application July 2, 1943, Serial No. 493,237

20 Claims. (Cl. 23—2)

This invention relates to a process for the recovery of fluorine compounds from gases containing the same and more particularly to the recovery of fluorine compounds from sinter gases.

In previous processes for the recovery of fluorine compounds, the recovery has been from the off-gases of superphosphate plants, which gases contain a relatively high concentration of fluorine compounds, particularly $SiF_4$. Such prior processes recover fluorine compounds from gases which contain in the neighborhood of 0.3 to 0.4 gram of fluorine per cubic foot of gas, and generally result in a removal of fluorine compounds down to about 0.02 to 0.03 gram per cubic foot of gas. This high concentration of fluorine compounds in the gases treated by prior processes together with the fact that the gases were relatively clean and contained few or no vapor or gaseous impurities of the type of $P_2O_5$, tar, sinter dust or sulfur compounds, made the recovery of such compounds a relatively simple chemical process.

As contrasted with the above mentioned recovery processes, the present process (although not limited thereto) operates upon a relatively dilute fluorine containing gas, the fluorine being present in the gas in the form of a variety of volatile fluorine compounds such as $SiF_4$, HF, etc. By relatively dilute, I mean gases containing of the order of 0.02 to 0.04 gram of F per cubic foot at standard conditions. Such relatively dilute fluorine containing gases are obtained when phosphatic matrix is sintered upon sintering machines of the Dwight and Lloyd type.

I have found that the major proportion of fluorine compounds present in a dilute gas of the type described above may be substantially completely removed by scrubbing the gas with a dilute aqueous solution containing fluosilicic acid and an alkali metal silicofluoride and then treating the scrubbing solution with a neutralizing agent such as a carbonate or a hydroxide of an alkali metal, for example, sodium carbonate, potassium carbonate, sodium hydroxide, potassium hydroxide, sodium oxide, potassium oxide or an alkali metal salt of an acid that is volatile under the conditions prevailing in the scrubber.

To obtain the highest efficiency in the scrubber it is essential that the scrubbing solution be dilute as to fluosilicic acid content; that the solution have a fluorine content of not less than 0.6 of 1% by weight and that the solution be maintained by the contained fluosilicic acid at or below a hydrogen ion concentration at which no substantial hydrolysis takes place. Such a solution will have a pH in the neighborhood of 3.5 or less. Utilizing a solution of such characteristics I find that the vapor pressure of the fluorine compounds over such solution at a practical scrubbing temperature is so low that the fluorine compounds in the gas are substantially all removed by the scrubbing solution. At the same time the use of a solution having the above hydrogen ion concentration for scrubbing purposes prevents the precipitation of silica, iron or aluminum phosphate compounds and hence prevents contamination of the final product with these impurities.

The prior processes for recovering fluorine compounds involve the treatment of the off-gases of superphosphate plants containing a relatively high concentration of fluorine compounds with water to form a fluosilicic acid solution containing silicic acid in suspension. The silicic acid formed is removed from the acid solution and the latter is treated with sodium chloride to produce sodium silicofluoride and hydrochloric acid. This procedure results in good recovery of fluorine from relatively strong fluosilicic acid solutions; it however would not be effective in very dilute acid solutions. Furthermore, as this procedure yields only that amount of sodium silicofluoride in excess of a saturated solution of this compound under strongly acid conditions, an excessively high loss of fluorine results when the waste liquor is discarded. Another objection to the sodium chloride process is that the HCl formed from sodium chloride presents a disposal problem and would be corrosive in a cyclic process.

As indicated above I recover fluorine compounds from gases containing the same by scrubbing the gases with a dilute fluosilicic acid solution of an alkali metal silicofluoride and then treat the scrubbing solution with an alkali metal compound of the type described above to form the corresponding alkali metal silicofluoride which precipitates and is separated from the reaction liquor by filtration or any other suitable method. The separated reaction liquor consisting of a dilute fluosilicic acid solution of an alkali metal silicofluoride is returned to the scrubber to recover additional amounts of fluorine. By operating in this manner I avoid all of the disadvantages arising from the use of sodium chloride and at the same time provide a continuous cyclic process of preparing alkali metal silicofluorides.

For example, by scrubbing fluorine containing gases with a dilute fluosilicic acid solution saturated with sodium silicofluoride and neutralizing the scrubbing solution with soda ash so as to bring the solution to a pH at which no substantial hydrolysis takes place, that is, to a pH in the neighborhood of 3.5 or lower. I obtain substantially quantitative precipitation of the sodium contained in the added sodium carbonate, as sodium silicofluoride and prevent this compound from precipitating at any point in the system other than the reactor. In this manner I also prevent silica, aluminum and iron phosphates, if present, from precipitating in the reactor or scrubber and thereby increase the yield and purity of the final product. Furthermore, after the reaction liquor is separated from the sodium silicofluoride formed by my process, the liquor has the proper dilution, pH and fluorine content for high scrubbing efficiency so that it is eminently suitable for recycling to the scrubber to remove additional quantities of fluorine from the gas being treated. Moreover, as the acid formed in the reactor is volatile and is ultimately removed when the liquid is recycled to the scrubber, there is no building up of acid in the reactor or scrubber with its accompanying corrosion and disposal problems and consequently there is also no decrease in the efficiency of the soda ash in the reactor or in the efficiency of the scrubbing solution.

In the practice of my process the phosphatic sintering machine gases are first passed into and through a dust trap wherein the larger solid particles are permitted to settle out of the gas stream by gravity. The gases then are passed to a scrubbing device wherein they are contacted with a substantially saturated solution of sodium silicofluoride maintained at a pH in the neighborhood of 3.5 or below by means of fluosilicic acid. The flow of the gas through the scrubbing device is counter-current to the flow of the solution. When employing an efficient scrubbing device where an intimate contact between the gas and the liquid may be achieved, the gases leaving the scrubber will be found to have a fluorine content in the neighborhood of 0.002 gram of F per cubic foot of gas.

The scrubbing solution is then treated to remove contained insoluble particles which may be effected by means of a thickener and a filter press, after which the contained fluosilicic acid is neutralized by reaction with soda ash forming sodium silicofluoride. The sodium silicofluoride being more insoluble than the fluosilica acid precipitates, and may then be removed by filtration or by decantation. The clarified filtrate and thickener overflow liquids are returned to the scrubbing device.

In carrying out my process the scrubbing temperature is controlled by the temperature of the gas being treated and by the vapor pressure of the scrubbing solutions. In the case of gas derived from the treatment of phosphatic material in a machine of the Dwight and Lloyd type, the sinter gases entering the scrubber are at a temperature of approximately 77° C. However, this gas temperature may vary with different sintering machines, the only limiting condition being that the partial pressure of the fluorine compounds in the gas must not exceed the fluorine compound vapor pressure of the scrubbing solution, otherwise no absorption will take place.

The temperature at which the reaction between the fluosilicic acid and the alkali metal compound occurs is not critical, but it is generally carried out at approximately 60° C. to avoid the necessity of cooling the acid solution after the scrubbing step.

My invention will be more readily understood by the reference to the accompanying drawing illustrating the flow sheet of my process.

In the drawing numeral 10 indicates a source of phosphatic fluorine containing sintering gases as for example, that derived from a Dwight and Lloyd sintering machine. Sinter gases of this type have, in addition to tar, dust and other solid material, substantially the following composition:

| | |
|---|---|
| Oxygen_____per cent by volume__ | 15.16 |
| Carbon dioxide_____do____ | 5.12 |
| Carbon monoxide_____do____ | 1.04 |
| Nitrogen _____do____ | 78.00 |
| Fluorine_____gm. cu. ft__ | 0.01–0.05 |
| Sulfur dioxide _____do____ | 0.03–0.07 |
| Sulfur trioxide, phosphorous pentoxide, etc _____ | Balance |

Such gases are passed to dust trap 11 wherein the larger solids are permitted to drop out of the gas and they are thereafter passed into scrubber 12 wherein they are contacted with a solution of sodium silicofluoride containing some free fluosilicic acid. The scrubber gases, after having been denuded of fluorine compounds, leave the scrubber by means of conduit 13 and may then be discharged to the atmosphere.

The scrubbing solution enters the scrubber 12 by means of pipe 14 and is intimately contacted with the gases within the scrubber by means of sprays or other liquid dispersion devices whereby an intimate contact between the gases and the liquid is obtained. The scrubbing solution leaves scrubber 12 by means of pipe 15 and at this point consists of a dilute solution of fluosilicic acid containing sodium silicofluoride. Generally approximately ¼ of the fluorine will be combined as the sodium salt, while about ¾ will be combined as fluosilicic acid. The solution leaves the scrubber by means of pipe 15, is collected in tank 16 and flows therefrom by means of pipe 17 through thickener 18. In thickener 18 a clarified solution is produced which is returned by means of pipe 19 to the inlet pipe 14 above mentioned. The slurry of solids produced by the thickener including the residual dust and tarry bodies present in the gases leaves the thickener by means of pipe 20 and flows to filter 21 wherein a separation of a filter cake and a filtrate is made. The filter cake, which is made up of the dust, dirt and tarry bodies originally present in the gas is discarded at this point. The filtrate produced by the filter passes by means of pipe 22 to the reactor 23. An addition of soda ash is made to the liquid in the reactor 23 in such proportions as to neutralize substantially all of the contained $H_2SiF_6$ without, however, carrying the alkalinity to such a point as to cause substantial hydrolysis and precipitation of silica from said solution. During the addition of soda ash, crystal formation and precipitation of $Na_2SiF_6$ take place, the crystals of this compound separating out and forming a crystal slurry. The slurry of sodium silicofluoride crystals and acid solution flows by means of pipe 24 into a settling tank 25 in which the slurry is concentrated and separated from a portion of the acid solution. The acid solution thus separated is recycled by pipes 25', 31 and 14 to form a part of the scrubbing liquid used in scrubber 12. The concentrated slurry flows by means of pipe 26 into filter 27. Filter 27 produces wet cakes of silicofluoride crystals, the crystals then being transported by means of conveyor 28 to dryer 29. Dryer 29 serves to remove the free moisture from the crystals after which the crystals comprising pure dry sodium silicofluoride are collected at a point 30 in suitable form for packaging.

The filtrate produced at filter 27 is discharged by means of pipe 31 and is combined with the liquid overflow from settling tank 25 and the clarified thickener liquid flowing in pipe 19. The combined liquids including the overflow from the settling tank, the thickener effluent and filtrate are passed through pipe 14 and are returned to the scrubber 12.

In view of the fact that the fluosilicic acid solution upon contacting the sinter gases dissolves alumina, iron and phosphates, it is desirable that a small proportion of the circulating liquid be removed from the system from time to time so that the concentration of these impurities will not build up to a point where they precipitate out of the solution with the sodium silicofluoride, thereby decreasing the purity of the product. Such removal is effected preferably by means of pipe 32 leading into a precipitation tank 33. In this tank the dissolved fluorine compounds are reacted with sodium chloride to form a precipitate which is removed by filter 34 as sodium silicofluoride crystals, the filtrate being discarded. These crystals may then be combined with the crystals obtained from filter 27 and are likewise dried in dryer 29. The crystalline material thus obtained constitutes the product of my process.

Sodium chloride is particularly suitable for use in the precipitating step in tank 33 as it yields an excess of sodium oxide at a low pH. Other compounds, however, such as sodium sulfate, sodium nitrate, potassium chloride, potassium sulfate and potassium nitrate may also be employed.

As the sinter gases are not generally saturated with water vapor at the temperature of the scrubbing solution, a certain amount of water is removed from the system by the sinter gases by evaporation and absorption. Water is lost also when a small proportion of circulating liquid and the wet crystals are removed from the system. To maintain the volume of circulating solution substantially constant and to replenish the water lost in the above described manner and thereby avoid loss of sodium silicofluoride by precipitation at some point in the system, water is periodically added by means of pipe 35.

Referring to the accompanying flow sheet it should be understood that in some instances dust trap 11, tank 16, thickener 18, filter 21, settling tank 25, precipitation tank 33, filter 34 and dryer 29 may all be omitted. Thus in the treatment of some fluorine containing gases the flow sheet in its simplest form would include only a scrubber 12, a reactor 23, a filter 27 and a conduit for returning the filtrate to scrubber 12. As applied to sinter gases, however, the flow sheet should at least comprise a scrubber 12, a filter 21, a reactor 23, a filter 27 and a conduit for recycling the filtrate to scrubber 12.

Instead of using a collecting tank 16 and a thickener 18 in combination with a scrubber 12, it should also be understood that a single unit such as a packed tower, a Bartlett and Snow rotor type scrubber, a Theissen washer or equivalent apparatus may be used.

While the above specific example of my invention has been limited to the treatment of sinter gases, it should be clearly understood that my process is applicable to the recovery of fluorine compounds from any gaseous mixture.

What I claim is:

1. The process for recovering fluorine compounds comprising silicon tetrafluoride from gases containing the same which comprises scrubbing the gases with a saturated aqueous solution of an alkali metal silicofluoride containing a sufficient amount of fluosilicic acid to maintain the pH of the solution at a point at which no substantial hydrolysis takes place.

2. The process for recovering fluorine compounds comprising silicon tetrafluoride from gases containing the same which comprises scrubbing the gases with a substantially saturated aqueous solution of an alkali metal silicofluoride containing a sufficient amount of fluosilicic acid to maintain the pH of the solution at a point at which no substantial hydrolysis takes place.

3. The process for recovering fluorine compounds comprising silicon tetrafluoride from gases containing the same which comprises scrubbing the gases with a substantially saturated aqueous solution of an alkali metal silicofluoride containing a sufficient amount of fluosilicic acid to maintain the pH of the solution at or below 3.5.

4. The process for recovering fluorine compounds comprising silicon tetrafluoride from gases containing same which comprises scrubbing the gases with a substantially saturated aqueous solution of sodium silicofluoride containing a sufficient amount of fluosilicic acid to maintain the pH of the solution at a point at which no substantial hydrolysis takes place.

5. The process defined in claim 2 in which sodium silicofluoride is the alkali metal silicofluoride employed.

6. The process defined in claim 3 in which sodium silicofluoride is the alkali metal silicofluoride employed.

7. The process for recovering fluorine compounds comprising silicon tetrafluoride from gases containing same which comprises scrubbing the gases with a saturated aqueous solution of an alkali metal silicofluoride containing a sufficient amount of fluosilicic acid to maintain the solution at a point at which no substantial hydrolysis takes place, neutralizing the resulting product by means of an alkali until the pH of the solution is raised to a point not substantially in excess of 3.5 and then separating the precipitated alkali metal silicofluoride from the neutralized product.

8. The process for recovering fluorine compounds comprising silicon tetrafluoride from gases containing same which comprises scrubbing the gases with a substantially saturated aqueous solution of sodium silicofluoride containing a sufficient amount of fluosilicic acid to maintain the pH of the solution at a point at which no substantial hydrolysis takes place, neutralizing the resulting product by means of sodium carbonate until the pH of the solution is raised to about 3.5 and then separating the precipitated sodium silicofluoride from the neutralized product.

9. The process for recovering fluorine compounds comprising silicon tetrafluoride from a relatively dilute fluorine containing gas which comprises scrubbing said gas with a substantially saturated aqueous solution of an alkali metal silicofluoride containing a sufficient amount of fluosilicic acid to maintain the solution at a point at which no substantial hydrolysis takes place, neutralizing the resulting product by means of an alkali until the pH of the solution is raised to a point not substantially exceeding 3.5 and then recovering the precipitated alkali metal silicofluoride from the neutralized product.

10. The process for recovering fluorine compounds from sinter gases containing about 0.02 to about 0.04 gram of fluorine per cubic foot at standard conditions which comprises scrubbing said gases with a saturated aqueous solution of an alkali metal silicofluoride containing a sufficient amount of fluosilicic acid to maintain the pH of the solution at a point at which no substantial hydrolysis takes place.

11. The process for recovering fluorine compounds from sinter gases containing about 0.02 to about 0.04 gram of fluorine per cubic foot at standard conditions which comprises scrubbing said gas with a substantially saturated aqueous solution of an alkali metal silicofluoride containing a sufficient amount of fluosilicic acid to maintain the pH of the solution at a point at which no substantial hydrolysis takes place, neutralizing the resulting product by means of an alkali until the pH of the solution is raised to a point not exceeding 3.5 and then recovering the precipitated alkali metal silicofluoride from the neutralized product.

12. The process for recovering fluorine compounds from sinter gas which comprises scrubbing said gas with a saturated aqueous solution of an alkali metal silicofluoride containing a sufficient amount of fluosilicic acid to maintain the pH of the solution at or below 3.5.

13. The process for recovering fluorine compounds from a sinter gas containing about 0.01 to about 0.05 gram of fluorine per cubic foot at standard conditions which comprises scrubbing said gas with a substantially saturated aqueous solution of an alkali metal silicofluoride containing a sufficient amount of fluosilicic acid to maintain the pH of the solution at a point at which no substantial hydrolysis takes place.

14. The process for recovering fluorine compounds from sinter gases which comprises scrubbing said gases with a saturated aqueous solution of an alkali metal silicofluoride containing a sufficient amount of fluosilicic acid to maintain the pH of the solution at a point at which no substantial hydrolysis takes place, separating the insoluble particles from the scrubbing liquid and neutralizing the resulting solution until its pH is raised to about 3.5.

15. A continuous process for recovering fluorine compounds from sinter gases containing the same, which comprises scrubbing the gases with a saturated or substantially saturated aqueous solution of an alkali silicofluoride containing a sufficient amount of fluosilicic acid to maintain the pH of the solution at a point at which no substantial hydrolysis takes place, neutralizing the resulting product with an alkali until the pH of the solution is raised to about 3.5 or below, separating the reaction liquor from the precipitated alkali silicofluoride and then returning said liquor to the scrubbing step of the process.

16. A continuous process for recovering fluorine compounds from sinter gases containing the same, which comprises contacting said gases in a scrubber with a substantially saturated aqueous solution of an alkali metal silicofluoride containing a sufficient amount of fluosilicic acid to maintain the pH of the solution at a point at which no substantial hydrolysis takes place, neutralizing the resulting product with an alkali until the pH of the solution is raised to a value of 3.5 or below, separating the reaction liquor from the precipitated alkali metal silicofluoride and recycling said liquor to said scrubber.

17. A continuous process for recovering fluorine compounds from sinter gases containing the same which comprises contacting said gases in a scrubber with a saturated aqueous solution of an alkali metal silicofluoride containing a sufficient amount of fluosilicic acid to maintain the pH of the solution at a point at which no substantial hydrolysis takes place, neutralizing the resulting product with soda ash until the pH of the solution is raised to a value of 3.5 or below, separating the reaction liquor from the precipitated sodium silicofluoride and recycling said liquor to said scrubber.

18. In a continuous process for recovering fluorine compounds from a gas, in which an aqueous solution of an alkali silicofluoride and fluosilicic acid is continuously circulated through a gas scrubber and a recovery unit, the step which comprises adding an alkali to said recovery unit to precipitate the corresponding silicofluoride, said alkali being added in controlled amounts so that the pH of said aqueous solution remains below the point at which substantial hydrolysis of the silicofluoride takes place.

19. In a continuous process for recovering fluorine compounds from a gas, in which an aqueous solution of an alkali silicofluoride and fluosilicic acid is continuously circulated through a gas scrubber and a recovery unit, the step which comprises adding an alkali carbonate to said recovery unit to precipitate the corresponding silicofluoride, said alkali carbonate being added in controlled amounts so that the pH of said aqueous solution remains below the point at which substantial hydrolysis of the silicofluoride takes place.

20. In a continuous process for recovering fluorine compounds from a gas, in which an aqueous solution of sodium silicofluoride and fluosilicic acid is continuously circulated through a gas scrubber and a recovery unit, the step which comprises adding sodium carbonate to said recovery unit to precipitate sodium silicofluoride, said sodium carbonate being added in controlled amounts so that the pH of said aqueous solution remains below the point at which substantial hydrolysis of the silicofluoride takes place.

OTHA C. JONES.